US010196791B1

(12) United States Patent
Oetken

(10) Patent No.: US 10,196,791 B1
(45) Date of Patent: Feb. 5, 2019

(54) COMPACTING MACHINE AND METHOD OF MONITORING COMPACTING MEMBER OF COMPACTING MACHINE

(71) Applicant: Caterpillar Paving Products Inc., Brooklyn Park, MN (US)

(72) Inventor: Nicholas A. Oetken, Brooklyn Park, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/823,199

(22) Filed: Nov. 27, 2017

(51) Int. Cl.
| | |
|---|---|
| *E01C 19/08* | (2006.01) |
| *E02D 3/026* | (2006.01) |
| *E02F 9/20* | (2006.01) |
| *E02F 9/26* | (2006.01) |
| *E01C 19/28* | (2006.01) |
| *G05D 1/00* | (2006.01) |
| *E01C 19/42* | (2006.01) |
| *E02D 3/068* | (2006.01) |
| *G05B 15/02* | (2006.01) |

(52) U.S. Cl.
CPC .......... *E02D 3/0265* (2013.01); *E01C 19/288* (2013.01); *E02F 9/2037* (2013.01); *E02F 9/262* (2013.01); *E02F 9/265* (2013.01); *E01C 19/08* (2013.01); *E01C 19/42* (2013.01); *E02D 3/068* (2013.01); *G05B 15/02* (2013.01); *G05D 1/0088* (2013.01)

(58) Field of Classification Search
CPC ...... E02D 3/0265; E02D 3/068; E02F 9/2037; E02F 9/262; E02F 9/265; E01C 19/08; E01C 19/42; E01C 19/288; G05B 15/02; G05D 1/0088

USPC ............................................... 404/84.05, 117
See application file for complete search history.

(56) References Cited

U.S. PATENT DOCUMENTS 3,153,993 A * 10/1964 Keppler ................ E01C 19/288
404/117
4,732,507 A * 3/1988 Artzberger .............. E02D 3/032
404/117
(Continued)

FOREIGN PATENT DOCUMENTS

| CN | 105019339 A | 11/2015 |
| CN | 205775745 U | 12/2016 |

*Primary Examiner* — Raymond W Addie
(74) *Attorney, Agent, or Firm* — Leydig, Voit & Mayer, LTD.

(57) ABSTRACT

A compacting machine includes a frame supporting a compacting member and a monitoring system. The monitoring system includes a sensor, a computer-readable medium bearing a compacting member monitoring program, a controller, and an interface device in communication with the controller. The sensor is arranged with the compacting member to sense a parameter of its ground-engaging surface and to generate a surface parameter signal indicative of the parameter. The controller is in communication with the sensor to receive the surface parameter signal therefrom and is configured to execute the compacting member monitoring program. The compacting member monitoring program is configured to determine whether a piece of the material being compacted becomes adhered to the ground-engaging surface based upon the surface parameter signal satisfying a condition and to produce, through the interface device, an indicator alerting the operator once the surface parameter signal satisfies the condition.

20 Claims, 4 Drawing Sheets

(56) References Cited

U.S. PATENT DOCUMENTS

| | | |
|---|---|---|
| 8,070,386 B2 | 12/2011 | Marsolek et al. |
| 8,827,593 B1 | 9/2014 | Oetken |
| 9,367,042 B2 | 6/2016 | Oetken et al. |
| 2008/0292401 A1 | 11/2008 | Potts |
| 2016/0024724 A1 | 1/2016 | Schmidt |
| 2016/0060819 A1 | 3/2016 | Oetken et al. |
| 2016/0076206 A1 | 3/2016 | Ries |
| 2016/0109858 A1 | 4/2016 | Oetken et al. |
| 2016/0244091 A1 | 8/2016 | Oetken et al. |
| 2016/0245785 A1 | 8/2016 | Marsolek et al. |
| 2016/0298308 A1 | 10/2016 | Oetken et al. |
| 2016/0362851 A1 | 12/2016 | Oetken |
| 2017/0073906 A1 | 3/2017 | LeDoux et al. |
| 2017/0107676 A1 | 4/2017 | Stevens et al. |
| 2017/0175345 A1 | 6/2017 | Oetken |
| 2017/0175346 A1 | 6/2017 | Oetken |
| 2017/0292249 A1 | 10/2017 | Rees et al. |
| 2017/0297581 A1 | 10/2017 | Hatfield et al. |
| 2017/0306572 A1 | 10/2017 | Oetken et al. |
| 2017/0314232 A1 | 11/2017 | Chi et al. |

\* cited by examiner

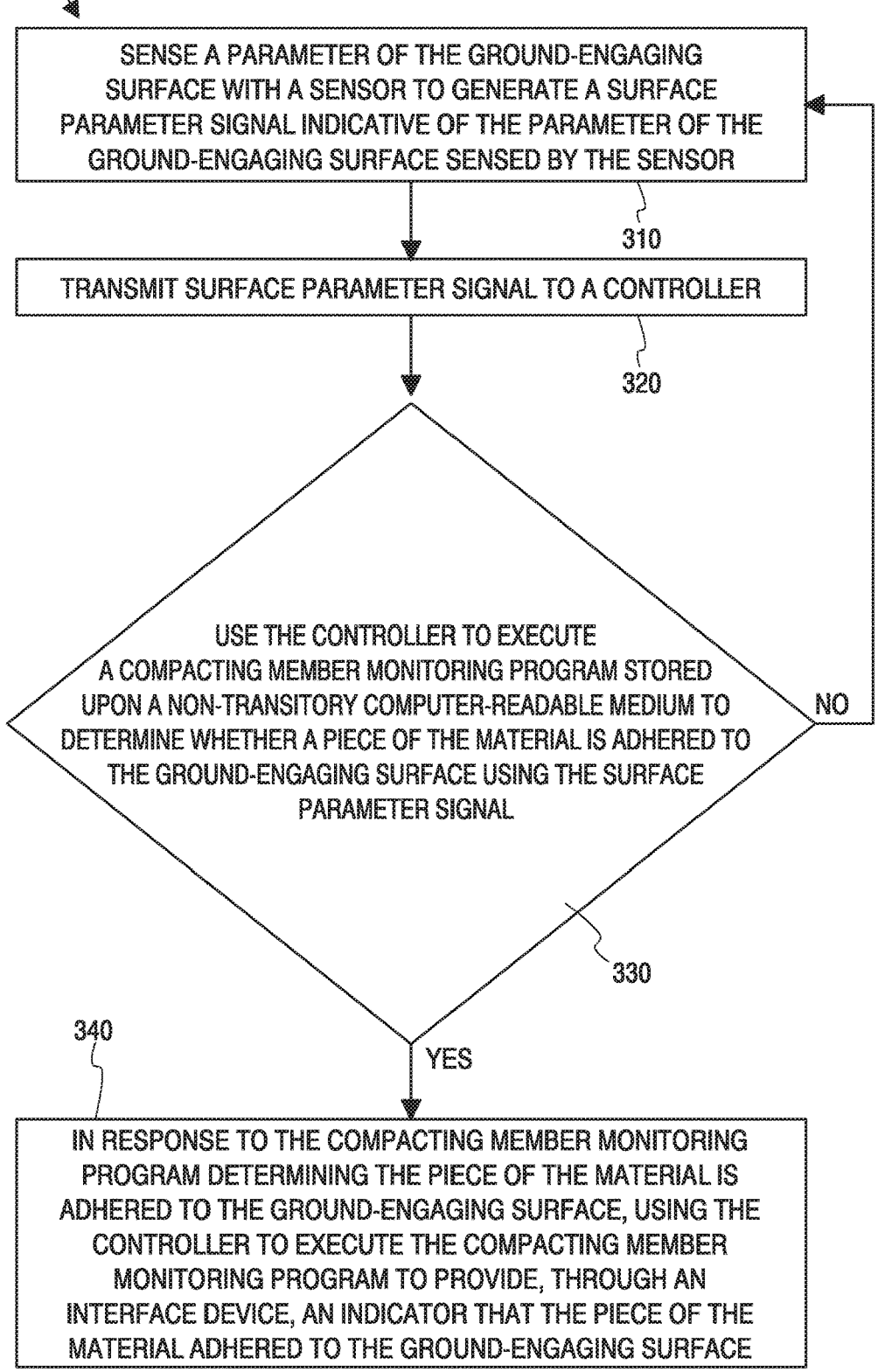

US 10,196,791 B1

COMPACTING MACHINE AND METHOD OF MONITORING COMPACTING MEMBER OF COMPACTING MACHINE

TECHNICAL FIELD

This patent disclosure relates generally to systems and methods for monitoring a compacting machine and, more particularly, to systems and methods for monitoring a ground-engaging surface of a compacting member of a compacting machine performing a compacting operation at a worksite.

BACKGROUND

Asphalt paving involves depositing a mat of paving material such as hot asphalt on a bed and then compacting the asphalt to a uniform thickness and consistency. Compactors use different configurations for the compacting process. Some compactors use a steel drum with vibrators. Other compactors use separate wheels, while others use a combination of separate wheels and drums.

During compaction, the compacting member can tend to collect pieces of the material being compacted on its ground-engaging surface via adhesion between the material being compacted and the compacting member. Pneumatic and vibratory asphalt compactors distribute water or other fluids on the tire and drum surface to help prevent asphalt material from sticking to them. When material does stick to the tire or drum, it can produce indentations in the road surface with every rotation or possibly cause more material to be pulled up from the asphalt mat. These indentations or holes in the road surface are undesirable. Often the machine operator does not see the material stuck to the tire or drum until it has caused multiple indentations.

U.S. Pat. No. 9,367,042 is entitled, "Machine Alert When Stopping on Hot Asphalt" and is directed to an alert system in equipment used in an asphalt paving environment, such as a compactor, that signals an operator when the equipment is stopped on hot asphalt, potentially over-compacting the area where the equipment is located. The alert system includes a surface temperature sensor so that the alert is only activated when there is a risk of over-compaction because the asphalt is still above a threshold temperature. The alert system may also include a timer so that the operator is not signaled during routine stopping associated with changing direction during compacting operations.

It will be appreciated that this background description has been created by the inventors to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

In one aspect of the present disclosure, embodiments of a compacting machine for compacting a material are described. In one embodiment, the compacting machine includes a frame, a compacting member, and a monitoring system.

The compacting member is mounted to the frame. The compacting member has a ground-engaging surface.

The monitoring system is supported by the frame and includes a sensor, a non-transitory computer-readable medium, a controller, and an interface device. The sensor is arranged with the compacting member to sense a parameter of the ground-engaging surface. The sensor is configured to generate a surface parameter signal indicative of the parameter of the ground-engaging surface sensed by the sensor. The non-transitory computer-readable medium bears a compacting member monitoring program. The controller is in communication with the sensor to receive the surface parameter signal from the sensor. The controller is in operable arrangement with the non-transitory computer-readable medium such that the controller is configured to execute the compacting member monitoring program contained thereon. The interface device is in communication with the controller.

The compacting member monitoring program includes a ground-engaging surface monitoring module and a messaging module. The ground-engaging surface monitoring module is configured to monitor for a piece of the material being adhered to the ground-engaging surface based upon the surface parameter signal from the sensor satisfying a condition. The messaging module is configured to produce, through the interface device, an indicator that the piece of the material adhered to the ground-engaging surface once the surface parameter signal satisfies the condition.

In another aspect of the present disclosure, embodiments are described of a method of monitoring a compacting member of a compacting machine for compacting a material. In one embodiment, a method of monitoring a compacting member of a compacting machine for compacting a material is used with a compacting member that includes a ground-engaging surface.

A parameter of the ground-engaging surface is sensed with a sensor to generate a surface parameter signal indicative of the parameter of the ground-engaging surface sensed by the sensor. The surface parameter signal is transmitted to a controller. The controller is used to execute a compacting member monitoring program stored upon a non-transitory computer-readable medium to determine whether a piece of the material is adhered to the ground-engaging surface using the surface parameter signal. In response to the compacting member monitoring program determining the piece of the material is adhered to the ground-engaging surface, the controller is used to execute the compacting member monitoring program to provide, through an interface device, an indicator that the piece of the material adhered to the ground-engaging surface.

Further and alternative aspects and features of the disclosed principles will be appreciated from the following detailed description and the accompanying drawings. As will be appreciated, systems and methods for monitoring a compacting member of a compacting machine and compacting machines incorporating the same which are disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 4 is a flowchart illustrating steps of an embodiment of a method of monitoring a compacting member of a compacting machine for compacting a material following principles of the present disclosure.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Embodiments of compaction machines and systems and methods for monitoring a compacting member of a compacting machine at a worksite are disclosed herein. In embodiments, a parameter of a ground-engaging surface of the compacting member is monitored while the compacting machine is being used at a worksite to perform a compacting operation to determine whether a piece of material being compacted becomes adhered to the ground-engaging surface of the compacting member. In embodiments, a suitable detection device is used to monitor the parameter of the ground-engaging surface as the compacting machine performs compacting operations.

In embodiments, suitable detection techniques include, but are not limited to, optical detection configured to monitor for color differences on the ground-engaging surface of the compacting member (e.g., asphalt is black, whereas the ground-engaging surface of a compacting member in the form of a drum can be gray or silver); optical detection to monitor for reflectance variations on the ground-engaging surface of the compacting member (e.g., the ground-engaging surface of the compacting member can be relatively more shiny than a piece of asphalt stuck thereto, especially when water is applied to the ground-engaging surface to help prevent a sticking condition); and laser/distance measurement detection to monitor for irregularities on the ground-engaging surface of the compacting member. It will be appreciated that, in other embodiments, other suitable detection techniques can be used to monitor a parameter of the ground-engaging surface of the compacting member to determine whether a piece of the material being compacted is adhered thereto.

In embodiments, once the system determines that a piece of the material being compacted has adhered to the ground-engaging surface of the compacting member, the system can be configured to issue an indicator alert to the operator of the compacting machine that material is stuck to the compacting member. The issuance of the indicator alert can allow the operator to remove the adhered material relatively quickly to help reduce continuing to compact the material with the adhered material interposed between the compacting member and the material being compacted so that the damage to the finished surface is reduced.

Figure 1:
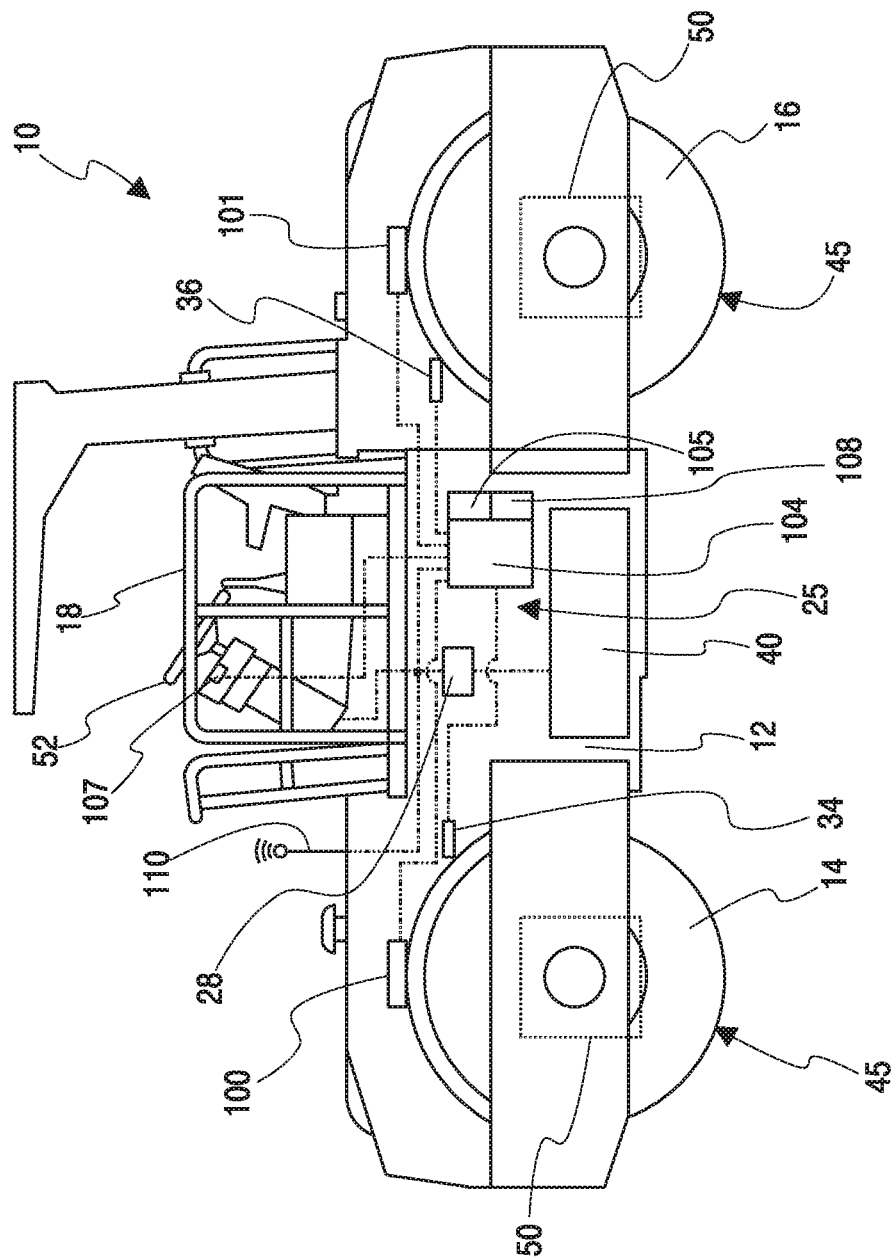
FIG. 1 is a diagrammatic side elevational view of an embodiment of a compacting machine which includes an embodiment of a system for monitoring a compacting member of a compacting machine constructed in accordance with principles of the present disclosure.

Turning now to the Figures, there is shown in FIG. 1 an exemplary embodiment of a compacting machine 10 constructed according to principles of the present disclosure which includes an embodiment of a system for monitoring a compacting member of the compacting machine. In the illustrated embodiment, the compacting machine 10 is in the form of a vibratory compactor machine.

The compacting machine 10 can be used in situations where loose surface material, characterized as material which can be further packed or densified, is disposed over the surface. As the compacting machine 10 travels over the surface, vibrational forces generated by the compacting machine 10 imparted to the surface, acting in cooperation with the weight of the compacting machine 10, compress the loose material to a state of greater compaction and density. The compacting machine 10 may make one or more passes over the surface to provide a desired level of compaction. The vibrational forces imparted to the surface may be determined based on properties of the work material, such as temperature. In one application, the loose material can be freshly-deposited asphalt that is to be compacted into roadways or similar hardtop surfaces. However, in other applications, the material may be soil, gravel, sand, landfill trash, concrete, combinations thereof, or other material capable of being compacted.

In other embodiments, the principles disclosed herein can be incorporated and used with other suitable machines. In other embodiments, the compacting machine 10 can have different forms, such as any other compacting machine known to those skilled in the art including soil compactors, asphalt compactors, utility compactors, pneumatic compactors, vibratory compactors, self-propelled two-wheel and four-wheel compactors, and tow-behind systems, for example. For example, in embodiments, the compactor machine comprises a vibratory compactor machine having one or more roller drums that are in rolling contact with a surface to be compacted. In embodiments, the compacting machine 10 includes a single compacting member.

The compacting machine 10 illustrated in FIG. 1 includes a frame 12, first and second compacting members 14, 16, an operator compartment 18, an embodiment of a monitoring system 25 constructed according to principles of the present disclosure, an autonomous control module 28, and first and second clearing devices 34, 36 respectively associated with the first and second compacting members 14, 16.

The frame 12 includes structural members of the compacting machine 10 that can be used to support other systems of the compacting machine 10 that enable the compacting machine 10 to function. In embodiments, the frame 12 can have any suitable configuration as will be appreciated by one skilled in the art.

To propel the compacting machine 10 over the surface, a power system, such as an engine 40, can also be mounted to the frame 12 and can be configured to generate power to move the compacting machine 10. One or more other implements (not shown) may be connected to the compacting machine 10. Such implements can be used for a variety of tasks, including, for example, loading, lifting, and brushing, and may include, for example, buckets, forked lifting devices, brushes, grapples, cutters, shears, blades, breakers/hammers, augers, and any other implement known in the art.

Each of the first and second compacting members 14, 16 is mounted to the frame 12. Each of the first and second compacting members 14, 16 has a ground-engaging surface 45. The first and second compacting members 14, 16 are configured to compact the material over which the compacting machine 10 is propelled. In embodiments, to transfer motive power from the engine 40 to the surface upon which the first and second compacting members 14, 16 are resting, the engine 40 can operatively drive and rotate only the first compacting member 14, only the second compacting member 16, or both the first and second compacting members 14, 16, through an appropriate power train.

In the illustrated embodiment, each of the first and second compacting members 14, 16 comprises a drum rotatably mounted to the frame 12. Both of the first and second compacting members 14, 16 are rotatably coupled to frame 12 so that the first and second compacting members 14, 16 are in rolling contact with the surface material as the compacting machine 10 travels over the material being compacted.

It will be appreciated that, in embodiments, the first compacting member 14 can have the same or different construction as the second compacting member 16. In the illustrated embodiment, the first and second compacting members 14, 16 have the same construction comprising an elongated, hollow cylinder with a cylindrical drum shell that encloses an interior volume. The cylindrical roller drum extends along and defines a cylindrical drum axis. To withstand being in rolling contact with and compacting the surface material, the drum shell can be made from a thick, rigid material such as cast iron or steel in embodiments.

In other embodiments, the compacting member can have a different construction, such as a rubber tire, for example. In embodiments, the compacting machine 10 can include a single roller drum and rubber tires (not shown) configured to contact the material being compacted.

Both the first compacting member 14 and the second compacting member 16 can have a vibratory mechanism 50 associated therewith. While FIG. 1 shows both the first and second compacting members 14, 16 being associated with vibratory mechanisms 50, in other embodiments, only one of the first and second compacting members 14, 16 has the vibratory mechanism 50. In still other embodiments, a single vibratory mechanism 50 or multiple vibratory mechanisms 50 can be located at different locations on the compacting machine 10. In embodiments, the vibratory mechanism 50 can have any suitable construction, as will be appreciated by one skilled in the art. In embodiments, the vibratory mechanism 50 can comprise a variable vibratory mechanism that is configured to impart a range of different vibrations.

The compacting machine 10 is adapted to be controlled by an operator. The operator compartment 18 is supported by the frame 12 and is configured to hold one or more operators therein during operation of the compacting machine 10. As shown in FIG. 1, the operator compartment 18 is mounted on top of the frame 12, from which an operator may control and direct operation of the compacting machine 10. Additionally, a steering apparatus 52 and similar controls can be located within the operator compartment 18.

Referring to FIG. 1, the compacting machine 10 includes an embodiment of a compacting member monitoring system 25 constructed according to principles of the present disclosure. The monitoring system 25 is configured to monitor both of the first and second compacting members 14, 16 for a sticking condition in which the material being compacted adheres to the ground-engaging surface 45 of one or both of the first and second compacting members 14, 16. In embodiments, the monitoring system 25 is configured to detect when a piece of material becomes adhered to the ground-engaging surface 45 of at least one of the first and second compacting members 14, 16 when a sensor detects the sticking condition has been satisfied. In embodiments, the determination of whether the condition has been satisfied is computed according to a predetermined technique.

The monitoring system 25 is supported by the frame 12. The illustrated monitoring system 25 includes first and second sensors 100, 101 respectively associated with the ground-engaging surface 45 of each of the first and second compacting members 14, 16, a controller 104, a non-transitory computer-readable medium 105, an interface device 107, a data storage device 108, and a communication device 110.

The first and second sensors 100, 101 are mounted to the frame 12 such that they are arranged with the first and second compacting members 14, 16, respectively, to sense a parameter of the ground-engaging surface 45. The first and second sensors 100, 101 are each configured to generate a surface parameter signal indicative of the parameter of the ground-engaging surface of the first and second compacting members 14, 16 respectively sensed by the first and second sensors 100, 101.

The controller 104 is in communication with the first and second sensors 100, 101 to receive the respective surface parameter signal from the first and second sensors 100, 101. The controller 104 is in operable arrangement with the non-transitory computer-readable medium 105 such that the controller 104 is configured to execute a compacting member monitoring program contained thereon. The compacting member monitoring program is configured to determine whether a piece of the material being compacted becomes adhered to the ground-engaging surface 45 of either (or both) of the first and second compacting members 14, 16.

The interface device 107 is mounted within the operator compartment 18. The interface device 107 is in communication with the controller 104. The interface device 107 is configured to produce an alert transmitted by the compacting member monitoring program via the controller 104 once the compacting member monitoring program has determined that a piece of the material being compacted has become adhered to at least one of the ground-engaging surfaces 45 of the first and second compacting members 14, 16.

The data storage device 108 is in communication with the controller 104. The data storage device 108 is configured to store therein data used by the compacting member monitoring program 105 when it is being executed by the controller 104.

The compacting member monitoring program 105 includes a ground-engaging surface monitoring module and a messaging module. The ground-engaging surface monitoring module is configured to monitor for a piece of the material being adhered to the ground-engaging surface 45 of each of the first and second compacting members 14, 16 based upon the surface parameter signal from the respective sensor 100, 101 satisfying a condition. The messaging module is configured to produce, through the interface device 107, an indicator alerting the operator that the piece of the material has become adhered to the affected ground-engaging surface 45 once the surface parameter signal satisfies the condition. In embodiments, the indicator can be configured to indicate which one of the first and second compacting members 14, 16 has the piece of material stuck thereto.

In the illustrated embodiment, the compacting machine 10 is also configured to be operated autonomously, and is provided with the autonomous control module 28 for that purpose. The autonomous control module 28 is configured to autonomously control operation of the compacting machine 10.

In embodiments, the autonomous control module 28 can include a suitable geolocation unit configured to generate a location signal indicative of a location of the compacting machine 10 for use by the autonomous control module 28. In embodiments, the geolocation unit can comprise any suitable device configured to determine the location of the compacting machine 10 and to send a location signal indicative of an absolute location (including, e.g., latitude, longitude, and altitude information) of the compacting machine 10 to the autonomous control module 28. For example, in embodiments, the geolocation unit comprises a Global Positioning System (GPS) receiver. In embodiments, the GPS receiver is configured to generate a location signal that includes a latitudinal position and a longitudinal position.

In other embodiments, the geolocation unit can comprise a portion of an Inertial Reference System (IRS), a local tracking system, or another known locating system that receives or determines positional information associated with the compacting machine 10. Suitable technologies for geolocation include, but are not limited to, the U.S. Global Positioning System, the Russian GLONASS satellite-based system, the European Galileo satellite-based system, and radio-positioning systems provided by Locata Corporation of Canberra, Australia, for example. In embodiments, the geolocation unit can be configured to receive and process geolocation signals from multiple systems to generate the location signal sent to the autonomous control module 28.

In some embodiments, the location signal generated by the geolocation unit can be conveyed to a remotely-located central station via the communication device 110 to convey signals indicative of the received or determined positional information of the compacting machine 10 for further processing by a remote operator. The remote operator of the compacting machine 10 can control the movement of the compacting machine 10 based on the determined geolocation signal. Control commands may be issued through the communication device 110 or any other suitable communication network as is known in the art.

Further, the autonomous control module 28 can be configured to autonomously operate the compacting machine 10 according to a set of instructions. The set of instructions can be located on the autonomous control module 28 onboard the compacting machine 10 or can be issued by a remotely-located central station through the communication device 110, for instance.

The controller 104 is in communication with the autonomous control module 28. In embodiments, the messaging module of the compacting member monitoring program 105 is configured to transmit a sticking condition signal via the controller 104 to the autonomous control module 28 once the surface parameter signal of one of the first and second sensors 100, 101 satisfies the condition.

The autonomous control module 28 can be configured to perform an asphalt-sticking control operation of the compacting machine 10 in response to receiving the sticking condition signal from the controller 104. For example, in embodiments, the asphalt-sticking control operation of the compacting machine 10 comprises at least one of terminating operation of the compacting machine 10 and shutting down the engine 40 of the compacting machine 10.

In other embodiments, the asphalt-sticking control operation of the compacting machine 10 comprises using the autonomous control module 28 to maneuver the compacting machine 10 along an exit path off the material. In embodiments, the autonomous control module 28 is in communication with a geolocation unit that can detect the location of the compacting machine 10 within a compacting area designated for material compaction. Upon receiving the sticking condition signal from the controller 104, the autonomous control module 28 can calculate an exit path that moves the compacting machine 10 outside of the perimeter of the compacting area using the geolocation unit. In embodiments, the autonomous control module 28 can calculate the exit path to be the shortest practical route.

In the illustrated embodiment, the first and second clearing devices 34, 36 are respectively associated with the first and second compacting members 14, 16. Each clearing device 34, 36 is mounted to the frame 12 proximate the compacting member 14, 16 with which it is associated. The controller 104 is in communication with both of the clearing devices 34, 36.

In embodiments, the messaging module of the compacting member monitoring program 105 is configured to transmit a command signal via the controller 104 to the clearing device 34, 36 associated with the compacting member 14, 16 having a piece of material stuck thereto to perform the clearing operation once the surface parameter signal from the sensor 100, 101 satisfies the condition. Each clearing device 34, 36 is configured to selectively perform a clearing operation in response to the command signal from the controller 104 to remove the material adhered to the ground-engaging surface 45 of the affected compacting member 14, 16.

In embodiments, the first and second clearing device 34, 36 can have the same construction, or be different form each other. In embodiments, any suitable clearing device can be used.

For example, in embodiments, each clearing device 34, 36 comprises a supply of fluid and a sprayer in fluid communication with the supply of fluid. The sprayer can be configured to selectively direct a pressurized spray of fluid upon the ground-engaging surface 45 of the compacting member 14, 16 having a piece of material adhered thereto once the command signal is received from the controller 104.

In other embodiments, each clearing device 34, 36 comprises a wiper blade movable over a range of travel between a stowed position, in which the wiper blade is in non-contacting relationship with the ground-engaging surface 45 of the compacting member 14, 16 with which it is associated, and a wiping position, in which the wiper blade is in contacting relationship with the ground-engaging surface 45 of the compacting member 14, 16 to remove the material adhered thereto. The wiper blade can be configured to move from the stowed position to the wiping position in response to receiving the command signal via any suitable technique. For example, in embodiments, at least one cylindrical actuators is provided to reciprocally move the wiper blade between the stowed position and the wiping position. Each such cylindrical actuator can be in communication with the controller 104 to receive the command signal therefrom.

Figure 2:
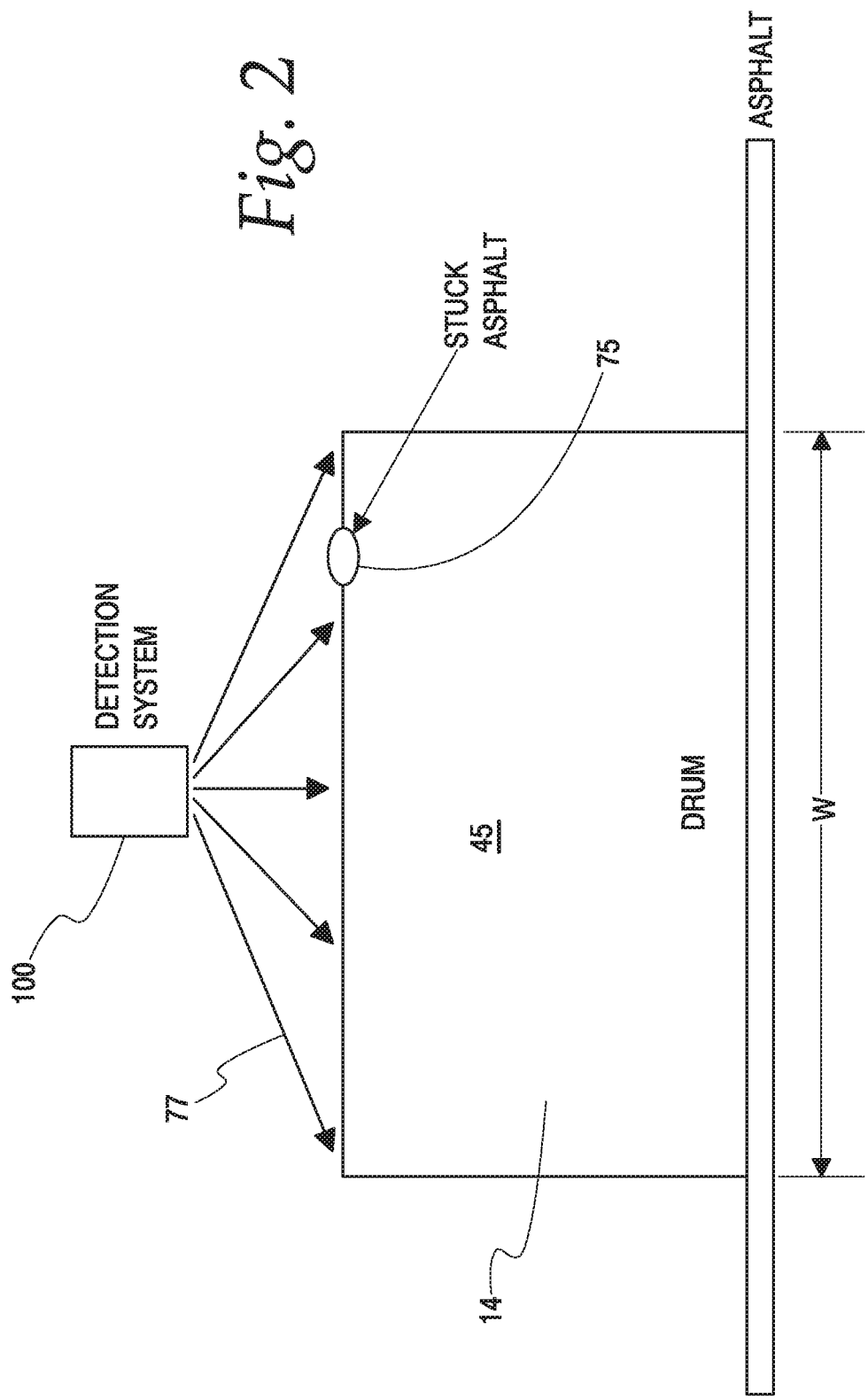
FIG. 2 is a fragmentary, diagrammatic elevational view of the compacting machine of FIG. 1.

Referring to FIG. 2, the first sensor 100 is shown disposed over the first compacting member 14 in diagrammatic fashion. It will be understood that the description of the first sensor 100 and the first compacting member 14 is also applicable to the second sensor 101 and the second compacting member 16, which in the illustrated embodiment both have a respectively similar construction. One skilled in the art will understand that, in embodiments, any suitable sensor can be used to detect whether a piece 75 of the material being compacted has become adhered to the ground-engaging surface of the compacting member.

For example, in embodiments, the sensor 100 comprises a distance sensor configured to detect a topographic variation on the ground-engaging surface 45 of the compacting member 14 caused by the piece of the material being adhered to the ground-engaging surface. In embodiments, the sensor 100 comprises a laser distance sensor. The sensor 100 can be configured to scan the entire width W of the ground-engaging surface 45 with a linear scan 77 such that as the compacting member 14 rotates relative the frame 12 to which the sensor 100 is mounted, the sensor 100 scans the entire surface area of the ground-engaging surface 45 for every complete revolution of the compacting member 14.

In other embodiments, the sensor 100 comprises an optical sensor. In embodiments, the optical sensor comprises a color sensor configured to detect a color variation on the ground-engaging surface 45 of the compacting member 14 caused by the piece 75 of the material being adhered to the ground-engaging surface 45. For example, in embodiments, the ground-engaging surface 45 is made from a metal that is gray in color. When the compacting machine is compacting asphalt, the sensor 100 can be configured to detect a color variation between the gray color of the ground-engaging surface 45 and the black color of the asphalt being compacted such that if a piece 75 of the asphalt becomes adhered to the ground-engaging surface 45, the sensor 100 is able to detect the color variation therebetween.

In other embodiments, the sensor 100 comprises another suitable optical sensor. For example, in embodiments, the optical sensor is in the form of a reflectance sensor that is configured to detect a reflection variation on the ground-engaging surface 45 of the compacting member 14 caused by the piece 75 of the material being adhered to the ground-engaging surface 45. For example, in some embodiments, a spray of water is directed upon the ground-engaging surface 45 of the compacting member 14 to help prevent material from becoming adhered thereto. The sensor 100 can be configured to detect the reflectance variation between the relatively shiny ground-engaging surface 45 (which is wetted with water) and the relatively dull piece of material adhered to the ground-engaging surface 45.

Figure 3:
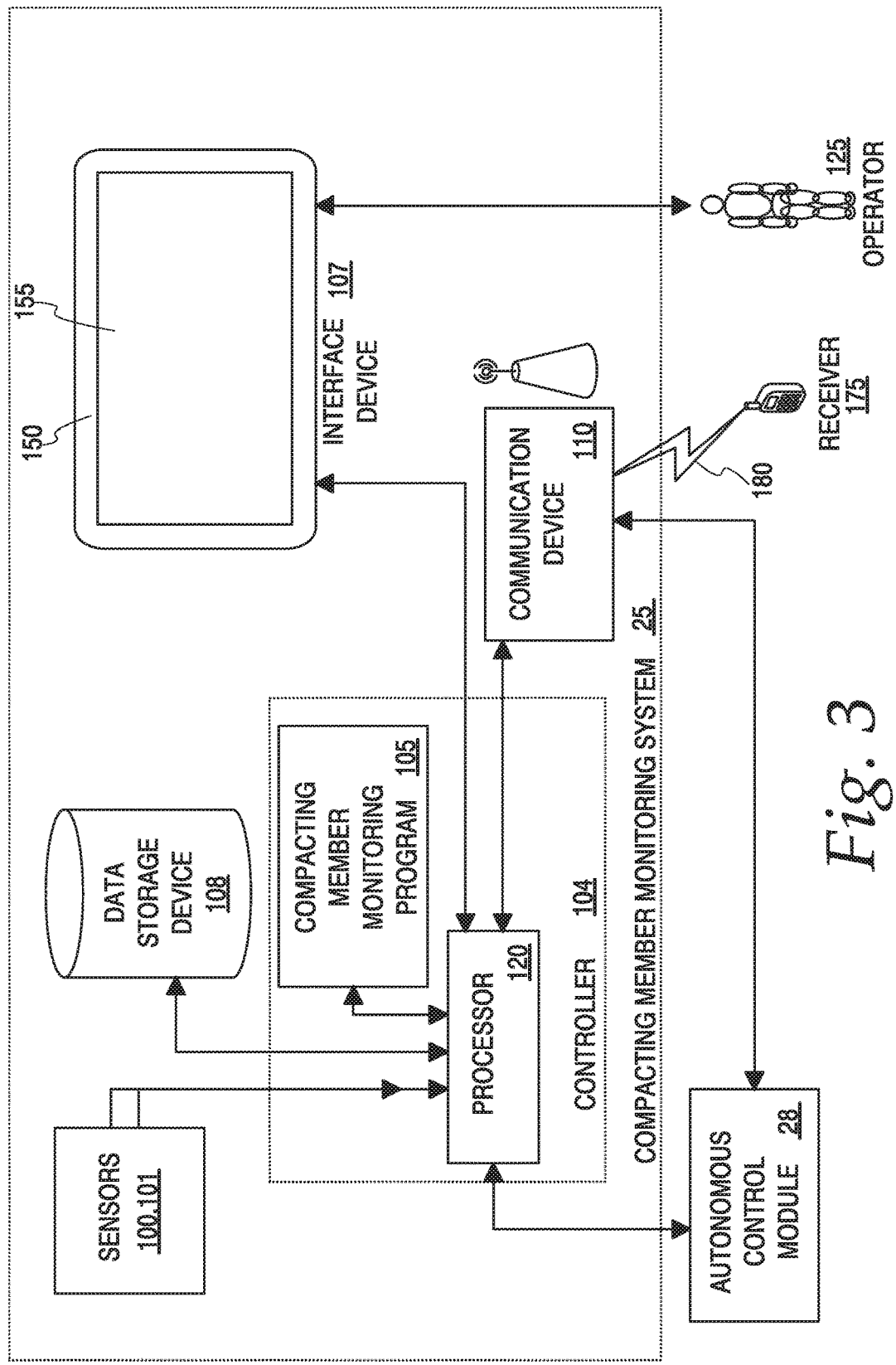
FIG. 3 is a schematic and diagrammatic view of an embodiment of a system for monitoring a compacting member of a compacting machine constructed in accordance with principles of the present disclosure.

Referring to FIG. 3, there is shown a schematic and diagrammatic view of the compacting member monitoring system 25 of the compacting machine 10. The first and second sensors 100, 101 are respectively arranged with the first and second compacting members 14, 16 to sense a designated parameter of the ground-engaging surface 45 of the respective compacting member 14, 16. Each of the sensors 100, 101 is configured to generate a respective parameter signal indicative of the parameter sensed by the particular sensor 100, 101. In embodiments, the sensors 100, 101 can comprise any suitable sensor configured to sense a parameter useful for detecting whether a piece of the material being compacted becomes adhered to the ground-engaging surface 45 of the compacting member 14, 16 with which the sensor 100, 101 is associated. In embodiments, the sensors 100, 101 are configured to transmit a parameter signal substantially continuously to the controller 104 while the compacting machine 10 is moving.

The controller 104 is in operable communication with the sensors 100, 101 to receive the respective parameter signals therefrom. The controller 104 is in operable arrangement with the non-transitory computer-readable medium 105 such that the controller 104 is configured to execute the compacting member monitoring program contained thereon. The controller 104 is also operably arranged with the autonomous control module 28, the interface device 107, the data storage device 108, and the communication device 110.

The controller 104 can include a processor 120 and be programmed with the compacting member monitoring program contained upon the non-transitory, tangible computer-readable storage medium 105. When executed by the processor 120, the compacting member monitoring program 105 provides the controller 104 with the functionality to monitor the compacting members 14, 16 of the compacting machine 10 (based upon the readings from the sensors 100, 101) to determine whether a material being compacted has become adhered to one or both of the ground-engaging surfaces 45 of the compacting members 14, 16.

In embodiments, the processor 120 can generally include any component of an application that can receive input from a client or the interface device 107, process the input, present the input to the compacting member monitoring program 105, and present output from the processor 120 to a client (such as a remotely-located central processing unit), the autonomous control module 28, the interface device 107, and/or to the data storage device 108, and execute logic for the compacting member monitoring program 105. In embodiments, the controller 104 can include one or more processors that can execute instructions and process data to perform one or more functions associated with the compacting member monitoring system 25. For instance, the controller 104 can execute software that enables the compacting member monitoring system 25 to request and/or receive data from outside of the compacting member monitoring system 25, such as operational data pertaining to the compacting machine 10 from one or more other systems.

In embodiments, the controller 104 is configured to communicate to another processing unit, such as a central computer system with which a fleet of compacting machines having a compacting member monitoring system constructed according to principles of the present disclosure is in communication. In embodiments, the controller 104 is configured to transmit a material-sticking event signal to an off board processing unit. In embodiments, the material-sticking event signal can include data generated by the compacting member monitoring system 25, including, e.g., parameter data and corresponding location data.

The non-transitory computer-readable medium 105 bears a compacting member monitoring program constructed according to principles of the present disclosure. In embodiments, the compacting member monitoring program 105 includes a graphical user interface. In embodiments, the compacting member monitoring program 105 is configured to monitor the parameter signals from the sensors 100, 101 to determine whether the compacting machine 10 experiences a material-sticking condition. In embodiments, the compacting member monitoring program 105 is configured to track the locations at the worksite where such sticking conditions occur so that the material being compacted can be examined to confirm that it is not damaged or otherwise unsatisfactorily compacted. In embodiments, the compacting member monitoring program 105 is configured to carry out any method (or steps of a method) of monitoring a compacting member of a compacting machine 10 that follows principles of the present disclosure. In embodiments, the compacting member monitoring program 105 can include a monitoring module, a tracking module, and a messaging module.

The monitoring module can be configured to monitor the parameter signals from each of the sensors 100, 101 for an occurrence of a material-sticking condition in which a piece of the material being compacted becomes adhered to at least one of the compacting members 14, 16. In embodiments, the monitoring module is configured to monitor for a material-sticking condition based upon a parameter exceeding a differential limit relative to a baseline value for the parameter stored in the data storage device 108.

In embodiments, the monitoring module can be configured to monitor the parameter signal from each of the sensors 100, 101 substantially continuously for an occurrence of a material-sticking condition. In embodiments, the monitoring module can be configured to monitor the parameter signal from each of the sensors 100, 101 only when the compacting machine 10 is moving, such as when it is engaged in a compacting operation. In some embodiments, the monitoring module can use the location signal from the geolocation unit to determine whether the machine is moving. In still other embodiments, a velocity of the compacting machine 10 from an on-board module of the machine can be in communication with the controller 104, and its velocity reading can be used by the monitoring module to determine whether the compacting machine 10 is moving.

In embodiments, the monitoring module of the compacting member monitoring program 105 is configured to determine whether a material-sticking condition has occurred based upon comparing the parameter signals from the sensors 100, 101 to a database of parameter data stored in the data storage device 108. In embodiments, a suitable statistical analysis technique applied to the database of parameter data can be used to monitor the parameter signals of the compacting machine 10 to determine whether a material-sticking condition has occurred.

The tracking module can be configured to track the location of the compacting machine 10 when the material-sticking condition occurred. In embodiments, the tracking module can use the data in the location signal from the geolocation unit to determine the location at which the material-sticking condition occurred. In embodiments, the tracking module can also store the time at which the compacting machine 10 experienced the material-sticking condition. In embodiments, the tracking module can be configured to store the location and/or time data relating to the material-sticking conditions experienced by the compacting machine 10 in the data storage device 108.

In embodiments, the controller 104 is adapted to assemble an indicator (such as in the form of a first pop-up message) from data in the data storage device 108 in response to receiving an indication from the monitoring module of the compacting member monitoring program 105 that the compacting machine 10 has experienced a material-sticking condition. In embodiments, the messaging module can be configured to display, through the graphical user interface, an indicator in the interface device 107 indicating that the material-sticking condition occurred once the parameter signal satisfies a predetermined condition. The controller 104 can transmit the indicator to the interface device 107 for display to the operator 125 via the graphical user interface of the compacting member monitoring program 105. In other embodiments, the indicator can be in the form of an audible sound emitted by a suitable speaker associated with the interface device 107. In embodiments, the indicator can include data describing the material-sticking condition, including for example the location of the material-sticking condition (e.g., which one of the compacting members 14, 16 is affected).

The interface device 107 is in operable communication with the controller 104. The interface device 107 is configured to display the graphical user interface of the compacting member monitoring program 105. In embodiments, the interface device 107 can be mounted within the operator compartment 18 of the compacting machine 10. In embodiments, the interface device 107 is configured to emit sound, and the indicator produced by the messaging module comprises an audible indicator emitted by the interface device 107.

The operator 125 can use the interface device 107 to receive information from the compacting member monitoring program 105 and to provide inputs to the controller 104 through the interface device 107. The interface device 107 can be configured to provide the operator 125 with an operable interface to other systems of the compacting machine 10.

The interface device 107 is coupled to the controller 104 to receive material-sticking data therefrom. In the illustrated embodiment, the interface device 107 is adapted to provide information in the form of visibly-displayed indicia. In embodiments, an audio device can be associated with the interface device 107 to provide audibly-perceptible information through a speaker. In embodiments, the compacting member monitoring program 105 can be configured such that the interface device 107 can display a graphical user interface generated by the compacting member monitoring program 105 and any suitable message compiled by the messaging module regarding the occurrence of a material-sticking condition of the compacting machine 10.

The interface device 107 can include hardware and/or software components configured to allow the operator 125 to access information stored in the data storage device 108. For example, the graphical user interface of the compacting member monitoring program 105 can include a data access interface configured to allow the operator 125 to access, configure, store, and/or download information to an off-board system or a receiver 175, such as a computer, a personal digital assistant (PDA) or smart phone using a particularly-configured mobile application ("app"), a diagnostic tool, or any other type of data device. Moreover, the interface device 107 can be configured to allow the operator 125 to access and/or modify information, such as operational parameters, operating ranges, material-sticking condition event information for a variety of locations, and/or threshold levels associated with one or more material-sticking condition configurations, stored in the data storage device 108.

In the illustrated embodiment, the interface device 107 is mounted within the operator compartment 18 (see FIG. 1). In other embodiments, the interface device 107 can be located elsewhere, including a location remote from the compacting machine 10.

Referring to FIG. 3, the illustrated embodiment of the interface device 107 comprises a liquid crystal display device 150. In embodiments, the liquid crystal display device 150 can be mounted within a panel configuration in the operator compartment 18 or as a stand-alone device.

In embodiments, the interface device 107 can comprise another type of display, a console, a keyboard, push buttons, voice recognition devices, a laptop computer, speakers, and/or other interfaces, as will be appreciated by one skilled in the art. In embodiments, the interface device 107 can include any type of display device that presents information.

The illustrated liquid crystal display device 150 includes a display screen in the form of a touch screen 155 adapted to display information to the operator 125 of the compacting machine 10 and to receive instructions from the operator 125 for transmission to the controller 104 via finger touch input. The touch screen 155 can include a message display section adapted to selectively display a plurality of pop-up messages, such as those generated by the controller 104 using the compacting member monitoring program 105. In other embodiments, the interface device 107 can include a different type of display screen, as will be appreciated by one skilled in the art.

The data storage device 108 is in operable communication with the controller 104. The data storage device 108 can generally include any type of system for storing data in non-volatile storage. This includes, but is not limited to, systems based upon: magnetic, optical, and magneto-optical storage devices, as well as storage devices based on flash memory and/or battery-backed up memory. The data storage device 108 can include a removable memory module, or a fixed memory module, or a combination of removable and fixed memory modules. In embodiments, the data storage device 108 can include an on-board memory device and/or a remotely-located off-board memory device that can be placed in communication with the controller 104 via the communication device 110.

The data storage device 108 can include one or more memory devices that store, organize, sort, filter, and/or arrange data used by the compacting member monitoring program 105. For example, in embodiments, the data storage device 108 includes a database of material-sticking condition data for a worksite. In embodiments, the material-sticking condition data can include any information generated by the compacting member monitoring program 105.

In embodiments, the data storage device 108 can be adapted to store message data for use by the messaging module of the compacting member monitoring program 105 in generating an indicator (such as in the form of at least one pop-up message). In embodiments, the data storage device 108 stores message data for a plurality of pop-up messages relating to material-sticking condition events.

In response to a command received from the interface device 107, for example, the controller 104 can be used to display material-sticking condition data stored in the data storage device 108 through the graphical user interface of the compacting member monitoring program 105 via the interface device 107. The information in the data storage device 108 can be selectively transmitted to the operator 125 via the interface device 107 and/or to the off-board receiver 175 via the communication device 110.

The communication device 110 is in operable arrangement with the controller 104 to communicatively transmit information from the compacting member monitoring system 25 to a suitable, off-board device, such as the receiver 175, for example. In embodiments, the communication device 110 is configured to transmit a material-sticking condition event signal from the controller 104 to the receiver 175, which is unsupported by the frame 12 of the compacting machine 10.

In embodiments, the communication device 110 can comprise any suitable equipment that facilitates the transmission of data between the compacting member monitoring system 25 and an off board device, such as the receiver 175 or a central computer system located remotely from the compacting machine 10. In embodiments, the communication device 110 can include hardware and/or software configured to send and/or receive data through a wireless communication link 180 across a wireless networking platform such as, for example, a satellite communication system. Alternatively and/or additionally, the communication device 110 can include one or more broadband communication platforms configured to communicatively couple the compacting member monitoring system 25 to an off board system, such as, for example, cellular, Bluetooth, microwave, point-to-point wireless, point-to-multipoint wireless, multipoint-to-multipoint wireless, or any other appropriate communication platform for networking a number of components.

In embodiments, the communication device 110 can be configured to establish a direct data link with an external data storage device. In embodiments, the external data storage device can be a part of the central computer system or in the form of a portable device for downloading the data from the compacting member monitoring system 25 and uploading the information to the central computer system, for example. In embodiments, the communication device 110 can include a wired network, such as, for example, Ethernet, fiber optic, waveguide, or any other type of wired communication network.

In embodiments, the communication device 110 uses a cellular network to transmit hazard event data to the receiver 175 which is in the form of a smart phone having a mobile app loaded thereon to visibly display the material-sticking condition data. In embodiments, the mobile app can be used to display the graphical user interface of the compacting member monitoring system 25 on the smart phone 175 to allow a user to input commands to the compacting member monitoring system 25 remotely using the smart phone 175 and to receive output therethrough in a manner similar to that using the interface device 107.

In embodiments, the central computer system/receiver 175 is configured to perform additional material-sticking condition analysis remotely from the compacting machine 10 and to transmit the additional material-sticking condition data back to the compacting member monitoring system 25 for further use in operating the compacting machine 10.

In embodiments, an embodiment of a compacting machine including a compacting member monitoring system constructed according to principles of the present disclosure can be used to carry out a method of monitoring a compacting member of a compacting machine in accordance with principles of the present disclosure to determine whether the compacting member has a piece of the material being compacted adhered thereto. Referring to FIG. 4, steps of an embodiment of a method 300 of monitoring a compacting member of a compacting machine following principles of the present disclosure are shown.

The method 300 of monitoring a compacting member of a compacting machine for compacting a material is used with a compacting member that includes a ground-engaging surface. A parameter of the ground-engaging surface is sensed with a sensor to generate a surface parameter signal indicative of the parameter of the ground-engaging surface sensed by the sensor (step 310). The surface parameter signal is transmitted to a controller (step 320). The controller is used to execute a compacting member monitoring program stored upon a non-transitory computer-readable medium to determine whether a piece of the material is adhered to the ground-engaging surface using the surface parameter signal (step 330). In response to the compacting member monitoring program determining the piece of the material is adhered to the ground-engaging surface, the controller is used to execute the compacting member monitoring program to provide, through an interface device, an indicator that the piece of the material adhered to the ground-engaging surface (step 340). In embodiments, the compacting member monitoring program determines whether a piece of the material is adhered to the ground-engaging surface using the surface parameter signal using any suitable detection technique, including any of those discussed above. In embodiments, the indicator comprises at least one of an audible indicator emitted by the interface device and a visual indicator displayed by the interface device via a graphical user interface.

In embodiments, a method following principles of the present disclosure further includes in response to the compacting member monitoring program determining the piece of the material is adhered to the ground-engaging surface, performing an autonomous control operation to change an operating parameter of the compacting machine.

In embodiments, a method of monitoring a compacting member of a compacting machine in accordance with principles of the present disclosure further includes, in response to the compacting member monitoring program determining the piece of the material is adhered to the ground-engaging surface, operating a clearing device to remove the material adhered to the ground-engaging surface.

In embodiments, the machine includes an operator compartment, and the interface device is mounted within the operator compartment. In embodiments, the method further includes displaying in the interface device, through the graphical user interface, a message containing loading condition data.

INDUSTRIAL APPLICABILITY

The industrial applicability of the embodiments of a compacting machine, a compacting member monitoring system, and a method of monitoring a compacting member of a compacting machine described herein will be readily appreciated from the foregoing discussion. The described principles are applicable to a variety of compacting machines and worksites. Using principles of the present disclosure, the occurrence of material sticking conditions upon one or more compacting members of a compacting machine performing a material compacting operation can be determined based upon the monitoring of a parameter of the ground-engaging surface of the compacting member(s) of the compacting machine when in service.

Furthermore, embodiments of a compacting member monitoring system constructed according to principles of the present disclosure can be used to identify a situation where the material being compacted becomes adhered to the ground-engaging surface of a compacting member of the compacting machine and, in response, perform a preventative measure to inhibit the negative impact produced by the material adhered to the ground-engaging surface and/or to perform a corrective measure to remove the piece of material stuck to the affected compacting member. In embodiments, the compacting member monitoring system can produce an alert indicator via an interface device for the operator of the compacting machine when it is determined that a piece of material has become adhered to the compacting member. In embodiments, the compacting machine can include an autonomous control module to automatically perform an asphalt-sticking control operation in response to the compacting member monitoring system determining a piece of material has become adhered to the compacting member.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A compacting machine for compacting a material, the compacting machine comprising:
a frame;
a compacting member, the compacting member mounted to the frame, the compacting member having a ground-engaging surface;
a monitoring system, the monitoring system supported by the frame and including:
a sensor, the sensor arranged with the compacting member to sense a parameter of the ground-engaging surface, the sensor configured to generate a surface parameter signal indicative of the parameter of the ground-engaging surface sensed by the sensor,
a non-transitory computer-readable medium, the non-transitory computer-readable medium bearing a compacting member monitoring program,
a controller, the controller in communication with the sensor to receive the surface parameter signal from the sensor, the controller in operable arrangement with the non-transitory computer-readable medium such that the controller is configured to execute the compacting member monitoring program contained thereon, and
an interface device, the interface device in communication with the controller,
wherein the compacting member monitoring program includes a ground-engaging surface monitoring module and a messaging module, the ground-engaging surface monitoring module configured to monitor for a piece of the material being adhered to the ground-engaging surface based upon the surface parameter signal from the sensor satisfying a condition, and the messaging module configured to produce, through the interface device, an indicator that the piece of the material adhered to the ground-engaging surface once the surface parameter signal satisfies the condition.

2. The compacting machine according to claim 1, wherein the compacting member comprises a drum, the drum rotatably mounted to the frame.

3. The compacting machine according to claim 1, wherein the sensor comprises a distance sensor configured to detect a topographic variation on the ground-engaging surface of the compacting member caused by the piece of the material being adhered to the ground-engaging surface.

4. The compacting machine according to claim 3, wherein the sensor comprises a laser distance sensor.

5. The compacting machine according to claim 1, wherein the sensor comprises an optical sensor configured to detect an optical variation on the ground-engaging surface of the compacting member caused by the piece of the material being adhered to the ground-engaging surface.

6. The compacting machine according to claim 5, wherein the optical sensor comprises a color sensor configured to detect a color variation on the ground-engaging surface of the compacting member caused by the piece of the material being adhered to the ground-engaging surface.

7. The compacting machine according to claim 5, wherein the optical sensor comprises a reflectance sensor configured to detect a reflection variation on the ground-engaging surface of the compacting member caused by the piece of the material being adhered to the ground-engaging surface.

8. The compacting machine according to claim 1, further comprising:
an operator compartment, the operator compartment supported by the frame;
wherein the interface device is mounted within the operator compartment.

9. The compacting machine according to claim 8, wherein the compacting member monitoring program includes a graphical user interface, the interface device is configured to display the graphical user interface of the compacting member monitoring program, and the messaging module is configured to display the indicator through the graphical user interface on the interface device.

10. The compacting machine according to claim 8, wherein the interface device is configured to emit sound, and the indicator produced by the messaging module comprises an audible indicator emitted by the interface device.

11. The compacting machine according to claim 1, further comprising:
an autonomous control module, the autonomous control module configured to autonomously control operation of the compacting machine;
wherein the controller is in communication with the autonomous control module;
wherein the messaging module of the compacting member monitoring program is configured to transmit a sticking condition signal via the controller to the autonomous control module once the surface parameter signal satisfies the condition;
wherein the autonomous control module is configured to perform an asphalt-sticking control operation of the compacting machine in response to receiving the sticking condition signal.

12. The compacting machine according to claim 11, wherein the asphalt-sticking control operation of the compacting machine comprises terminating operation of the compacting machine.

13. The compacting machine according to claim 11, wherein the asphalt-sticking control operation of the compacting machine comprises maneuvering the compacting machine along an exit path off the material.

14. The compacting machine according to claim 1, further comprising:
a clearing device, the clearing device mounted to the frame proximate the compacting member, the clearing device configured to selectively perform a clearing operation to remove the material adhered to the ground-engaging surface;
wherein the controller is in communication with the clearing device;
wherein the messaging module of the compacting member monitoring program is configured to transmit a command signal via the controller to the clearing device to perform the clearing operation once the surface parameter signal satisfies the condition.

15. The compacting machine according to claim 14, wherein the clearing device comprises a supply of fluid and a sprayer in fluid communication with the supply of fluid, the sprayer configured to selectively direct a pressurized spray of fluid upon the ground-engaging surface of the compacting member once the command signal is received from the controller.

16. The compacting machine according to claim 14, wherein the clearing device comprises a wiper blade movable over a range of travel between a stowed position in which the wiper blade is in non-contacting relationship with the ground-engaging surface of the compacting member and a wiping position in which the wiper blade is in contacting relationship with the ground-engaging surface of the compacting member to remove the material adhered thereto, the wiper blade configured to move from the stowed position to the wiping position in response to receiving the command signal.

17. A method of monitoring a compacting member of a compacting machine for compacting a material, the compacting member including a ground-engaging surface, the method of monitoring comprising:
sensing a parameter of the ground-engaging surface with a sensor to generate a surface parameter signal indicative of the parameter of the ground-engaging surface sensed by the sensor;
transmitting the surface parameter signal to a controller;
using the controller to execute a compacting member monitoring program stored upon a non-transitory computer-readable medium to determine whether a piece of the material is adhered to the ground-engaging surface using the surface parameter signal;
in response to the compacting member monitoring program determining the piece of the material is adhered to the ground-engaging surface, using the controller to execute the compacting member monitoring program to provide, through an interface device, an indicator that the piece of the material adhered to the ground-engaging surface.

18. The method of monitoring according to claim 17, wherein the indicator comprises at least one of an audible indicator emitted by the interface device and a visual indicator displayed by the interface device via a graphical user interface.

19. The method of monitoring according to claim 17, further comprising:
in response to the compacting member monitoring program determining the piece of the material is adhered to the ground-engaging surface, performing an autonomous control operation to change an operating parameter of the compacting machine.

20. The method of monitoring according to claim 19, further comprising:
in response to the compacting member monitoring program determining the piece of the material is adhered to the ground-engaging surface, operating a clearing device to remove the material adhered to the ground-engaging surface.

* * * * *